May 17, 1927. 1,629,292
R. J. NEWSOM
METHOD OF AND APPARATUS FOR MAKING CEMENT LINED PIPE
Filed Nov. 1, 1926

Inventor:
Reeves J. Newsom
by Jas. H. Churchill
Atty.

Patented May 17, 1927.

1,629,292

UNITED STATES PATENT OFFICE.

REEVES J. NEWSOM, OF LYNN, MASSACHUSETTS.

METHOD OF AND APPARATUS FOR MAKING CEMENT-LINED PIPE.

Application filed November 1, 1926. Serial No. 145,451.

This invention relates to a method of and apparatus for making cement-lined pipe and is an improvement upon the invention disclosed in United States Patent No. 1,548,161 granted to me August 4, 1925.

The present invention has for its object to produce a cement-lined pipe having its cement lining of substantially uniform thickness circumferentially of the pipe for the length of the same irrespective of the condition of the inner surface of the pipe.

To this end provision is made for effecting an even distribution of the cement in plastic form circumferentially of the pipe, and provision is also made for compensating for the resistance to movement of the body of plastic cement lengthwise of the pipe, offered by the inner surface of the pipe.

These and other features of this invention will be pointed out in the claims at the end of this specification.

Figure 2:
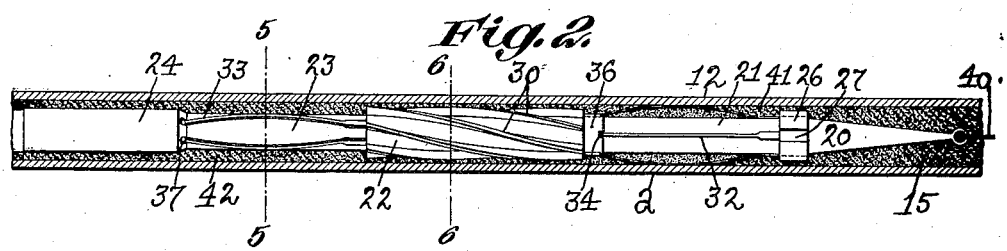
Figure 5:
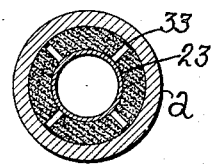
Figure 6:
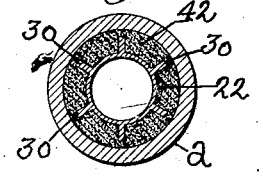

Fig. 5, a cross section on an enlarged scale on the line 5—5, Fig. 2;

Fig. 6, a cross section on an enlarged scale, on the line 6—6, Fig. 2, and

Figure 4:
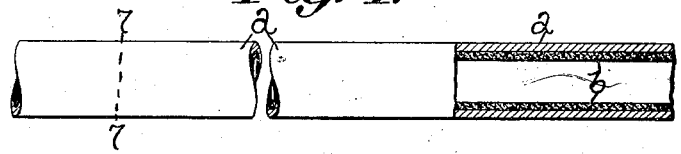
Fig. 4 is a view in elevation and section of a portion of the finished pipe.
Figure 7:
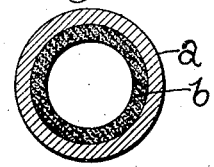

Fig. 7, a cross section of the finished pipe on an enlarged scale, taken on the line 7—7, Fig. 4.

Figure 1:
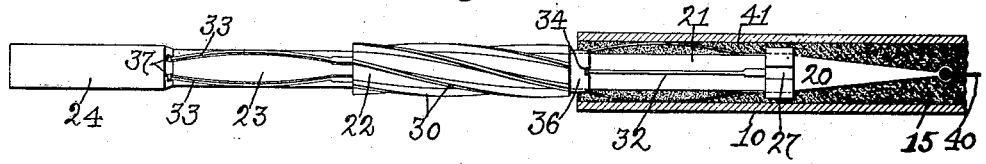
Figs. 1, 2 and 3 represent in section portions of an iron or other pipe and an apparatus with which the improved method of manufacturing cement-lined pipe may be practised.
Figure 3:
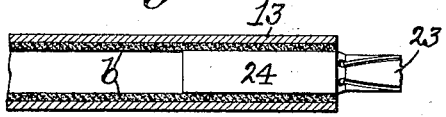

Referring to Figs. 1, 2 and 3, $a$ represents a pipe to be lined, which may be of iron, steel or other metal, and of any desired size or diameter according to the use to which the lined pipe is to be put.

The three pieces or sections 10, 12, 13 of pipe shown in Figs. 1, 2 and 3 form part of a continuous length of pipe, the pieces 10, 13 being the end portions and the piece 12, the intermediate portion of said pipe.

The pipe $a$ is provided with a finished lining $b$ of cementitious material (see Fig. 4), which is of substantially uniform thickness circumferentially of the pipe for the length of the same, and which may be cement such as now commonly used in the manufacture of cement pipe.

To provide the pipe $a$ with the lining $b$ of cement which is of substantially uniform thickness circumferentially of the pipe, a portion of the cement within the pipe $a$ while in plastic condition, is distributed circumferentially of the pipe.

This will preferably be effected by apparatus as will be described.

The finished cement lining $b$ is formed from a mass 15 of cement which fills the pipe $a$ for a portion of its length, preferably from $1/4$ to $1/3$ the length of the pipe.

The mass 15 of cement is moved forward lengthwise of the pipe $a$ and the character of the lining $b$ is influenced by the resistance offered to the bodily movement of the mass of cement in the pipe $a$.

This resistance is varied by the character or physical condition of the inner surface of the pipe $a$, which inner surface in some pipes is smooth or substantially smooth and in other pipes is rough and provided with projections which vary in size or depth and which offer material resistance to the movement of the mass 15 of cement, whereas when the inner surface of the pipe $a$ is smooth or substantially smooth a minimum resistance is offered to the movement of the mass of cement in the pipe.

The mass 15 of cement in the pipe $a$ is converted into a cement pipe or lining $b$ for the pipe $a$, by an apparatus which is drawn through the pipe $a$ and which will be hereinafter referred to as the mandrel, which is preferably of the construction herein shown and is provided with a conical nose portion 20, a tube-forming section 21, a distributing section 22, and additional tube-forming sections 23, 24.

The sections referred to may and preferably will be detachably connected together in any suitable manner, and the distributing section 22 is preferably located between the tube-forming sections 21, 23.

The conical nose 20 is provided at its rear end with a collar 26 which in some cases may be solid and in other cases may be provided with slots 27 extended through the collar, and the size or diameter of the collar 26 may be varied to meet the interior condition of the pipe $a$.

The collar 26 determines the quantity of the mass of the cement which is used to form the lining $b$.

When the inner surface of the pipe $a$ is rough and provided with projections, the collar 26 is made small enough to afford a relatively free passage for the mandrel, and when the inner surface of the pipe is smooth or substantially so, the collar is made materially larger but is provided with the axially extended slots 27 for the passage through them of a portion of the mass of cement, and between these two extremes, the collar is provided with slots of an area which varies according to the roughness of the inner surface of the pipe.

In this manner the resistance offered by the mass of cement in front of the mandrel to the passage of the mandrel through it, due to variations in density of the mass of cement, is materially reduced.

Variation in the thickness of the plastic cement which passes by the collar 26 and forms the lining is taken care of by the helical vanes or blades 30 of the distributing member or section 22 of the mandrel, for as the mandrel is drawn through the pipe, the plastic cement, for a portion of its depth or thickness, has imparted to it a movement within the pipe circumferentially thereof so as to evenly distribute it circumferentially of the pipe within the same and form a plastic lining of substantially uniform thickness circumferentially of the pipe.

After the plastic lining has been rendered of substantially uniform thickness by the helical distributor, it is allowed to expand by the succeeding section 23 of the mandrel and is then compressed by the larger, final forming section or follower 24.

The tube-forming sections 21, 23 of the mandrel are provided with flexible guide members or bow-shaped metal strips 32, 33, which are fastened at their front ends to the mandrel sections 21, 23 respectively, and are designed to engage the inner surface of the pipe and are free to be moved lengthwise to compensate for variations in the internal diameter of the pipe.

Provision is made for restraining the free ends of the guiding members against twisting movement, that is, against movement circumferentially of the mandrel, and to this end, the free end of the guide members are extended into axially arranged slots.

One set 34 of slots is located in a collar 36 on the rear end of the mandrel section 21 and the other set 37 in the front end of the follower 24.

In operation, the conical nose 20 of the mandrel is entered into the plastic mass 15 of cement which fills the rear end of the pipe as indicated in Fig. 1, and the mandrel and follower are drawn through the pipe by means of the wire or cord 40.

As the mandrel is drawn into the pipe $a$, it is centered therein by the front set 32 of the yielding guiding members, and the portion of the mass 15 of cement engaged by the front face of the collar is pushed forward, while another portion passes between the collar 26 and the pipe and also through the slots 27 in the collar, when the collar is slotted, and is converted into the form of a tubular section 41 of greater thickness and less internal diameter than that of the finished lining $b$.

As the mandrel progresses through the pipe $a$, the tubular section 41 of plastic cement is acted upon by the helically arranged blades or vanes 30 of the distributor 22, which impart a rotary movement to a portion of the cement of the tubular section 41 circumferentially of the pipe and effects an even distribution of the cement about the inner circumference of said pipe and forms the tubular section 42 of uniform or substantially uniform thickness.

On the further progress of the mandrel through the pipe, the second set 33 of guiding members engages the pipe and assists in centering the mandrel within the pipe, and on the continued advance of the mandrel, the tubular section 42 is acted upon by the follower 24 which being of larger diameter than the mandrel section 23 enlarges the internal diameter of the tubular section 42, fills the slots therein formed by the guiding members 33, and compresses and compacts the plastic mass thereof to form the finished lining $b$.

From the above description, it will be seen that the collar on the nose engages a considerable amount of the mass of cement in front of it, and as the mandrel advances in the pipe, the collar moves forward the portion of the mass in contact with it, and thereby causes the mass in front of it to offer a substantially greater resistance to the forward movement of the mandrel than if the collar were omitted and thereby effect longitudinal movement of a greater amount of the cement while providing sufficient space for the free passage of that portion of the plastic mass which is to form the lining. This space as above stated varies with the character of the inner surface of the pipe, being wholly between the collar and the pipe, when the collar is solid and small and the interior of the pipe of maximum roughness, and being partially between the collar and the pipe and partially in the collar, as the interior of the pipe approaches smoothness.

The mass of cement in front of the mandrel varies in density or solidity, and the more solid part offers a greater resistance to the advance of the mandrel, with the result that the portion of greater solidity leaves more cement behind the collar than does the less solid portion of the cement and forms a tubular section 41 of greater thickness on one side of the pipe than on the other, which variation in thickness is overcome or at least reduced to a minimum by moving a portion of the thicker plastic cement circumferentially within the pipe so as to evenly distribute it on the inner circumference of the pipe and thereby obtain a lining of substantially uniform thickness throughout the length of the pipe.

It will thus be observed that in the making of the cement-lined pipe having a lining of uniform thickness, the cement has imparted to it a movement longitudinally of the pipe and also a movement circumferentially thereof, and while it is preferred to effect these movements in the order described herein and with the apparatus shown, it is not desired to limit the invention in this respect.

What is claimed is:

1. The method of making cement-lined pipe, which consists in moving a portion of a mass of cement within the pipe longitudinally thereof to form a tubular lining from the remaining portion of said mass, and moving a portion of the tubular lining thus formed circumferentially of the pipe to form a tubular lining of substantially uniform thickness circumferentially of the pipe.

2. The method of making cement-lined pipe, which consists in forming a tubular lining section of cement within the pipe, and moving a portion of said lining section circumferentially of the pipe to render the tubular lining of substantially uniform thickness circumferentially of the pipe.

3. Apparatus for forming a tubular cement lining within a pipe from a mass of plastic cement within the pipe comprising a mandrel having a conical nose provided with a collar of larger diameter than said nose to effect movement of a portion of the cement mass and form a tubular section from another portion of the mass, and having a distributing section behind said nose and collar having a helically arranged vane or blade to effect movement of a portion of said tubular cement section circumferentially of the pipe to form a tubular section of substantially uniform thickness circumferentially of the pipe, and having a follower for compressing the tubular section of substantially uniform thickness.

4. Apparatus for forming a tubular cement lining within a pipe from a mass of plastic cement within the pipe comprising a mandrel having a conical nose provided with a collar of larger diameter than said nose to effect movement of a portion of the cement mass and form a tubular section from another portion of the mass.

5. Apparatus for forming a tubular cement lining within a pipe from a mass of plastic cement within the pipe comprising a mandrel having a conical nose provided with a slotted collar of larger diameter than said nose to effect movement of a portion of the cement mass and form a tubular section from another portion of the mass.

6. Apparatus for forming a tubular cement lining within a pipe from a mass of plastic cement within the pipe comprising a mandrel having means for distributing the cement circumferentially of the pipe to form a tubular lining of substantially uniform thickness circumferentially of the pipe.

7. Apparatus for forming a tubular cement lining within a pipe from a mass of plastic cement within the pipe comprising a mandrel having centering devices anchored at one end and having their opposite ends free to move lengthwise of the mandrel, and means co-operating with said free ends to restrain them from movement circumferentially of the mandrel.

8. Apparatus for forming a tubular cement lining within a pipe from a mass of plastic cement within the pipe comprising a mandrel having at its front end a collar of larger diameter than the front end of the mandrel to effect movement of a portion of the cement mass and form a tubular section from another portion of the mass.

In testimony whereof, I have signed my name to this specification.

REEVES J. NEWSOM.